US009832342B2

(12) United States Patent
Cai et al.

(10) Patent No.: US 9,832,342 B2
(45) Date of Patent: Nov. 28, 2017

(54) METHOD AND DEVICE FOR TRANSMITTING IMAGE

(71) Applicant: Xiaomi Inc., Beijing (CN)

(72) Inventors: Jingwei Cai, Beijing (CN); Zhukun Liu, Beijing (CN); Cheng Qian, Beijing (CN)

(73) Assignee: XIAOMI INC., Beijing (CN)

( * ) Notice: Subject to any disclaimer, the term of this patent is extended or adjusted under 35 U.S.C. 154(b) by 125 days.

(21) Appl. No.: 14/689,049

(22) Filed: Apr. 17, 2015

(65) Prior Publication Data

US 2016/0055621 A1 Feb. 25, 2016

Related U.S. Application Data

(63) Continuation of application No. PCT/CN2015/071363, filed on Jan. 22, 2015.

(30) Foreign Application Priority Data

Aug. 22, 2014 (CN) .......................... 2014 1 0419285

(51) Int. Cl.
*H04N 1/333* (2006.01)
*H04N 1/00* (2006.01)
*H04N 1/23* (2006.01)

(52) U.S. Cl.
CPC ..... *H04N 1/33315* (2013.01); *H04N 1/00095* (2013.01); *H04N 1/00204* (2013.01); *H04N 1/2361* (2013.01); *G09G 2340/0407* (2013.01); *H04N 2201/325* (2013.01); *H04N 2201/33328* (2013.01)

(58) Field of Classification Search
None
See application file for complete search history.

(56) References Cited

U.S. PATENT DOCUMENTS

2004/0215625 A1 10/2004 Svendsen et al.
2006/0256376 A1* 11/2006 Hirooka ........... H04N 21/23436
358/1.15

(Continued)

FOREIGN PATENT DOCUMENTS

CN 101039372 A * 9/2007
CN 101699839 A 4/2010

(Continued)

OTHER PUBLICATIONS

First office action from SIPO dated Jun. 2, 2015 for Chinese Application No. 201410419285.

(Continued)

*Primary Examiner* — Xiao Wu
*Assistant Examiner* — Steven Elbinger
(74) *Attorney, Agent, or Firm* — Jun He Law Offices P.C.; James J. Zhu (57) ABSTRACT

The present disclosure relates to a method and a device for transmitting an image, which improve display effect of the image. The method includes receiving an image with a first resolution from a source terminal; sending a request for obtaining the image to a server according to an identifier of the image; and receiving the image with a second resolution from the server, wherein the second resolution is higher than the first resolution.

10 Claims, 5 Drawing Sheets

(56) References Cited

U.S. PATENT DOCUMENTS

| | | | | |
|---|---|---|---|---|
| 2008/0024520 A1* | 1/2008 | Rudd | ................ | G06F 17/30017 345/619 |
| 2009/0317010 A1* | 12/2009 | Gerhard | ............... | H04N 19/162 382/240 |
| 2010/0071039 A1* | 3/2010 | Kashima | ............ | H04N 1/00244 726/5 |
| 2011/0304625 A1* | 12/2011 | Gerhard | .................. | G06T 11/00 345/428 |
| 2014/0023294 A1* | 1/2014 | Bose | .................... | G06T 3/4007 382/299 |

FOREIGN PATENT DOCUMENTS

| | | | |
|---|---|---|---|
| CN | 102364963 A | 2/2012 | |
| CN | 102508851 A | 6/2012 | |
| CN | 102802129 A | 11/2012 | |
| CN | 103365621 A | 10/2013 | |
| CN | 103796073 A | 5/2014 | |
| DE | 10141007 A1 * | 12/2002 | ........... G06F 3/1454 |
| JP | 200111651 A | 4/2001 | |
| JP | 2003219386 A | 7/2003 | |
| JP | 2004110677 A | 4/2004 | |
| JP | 2004304309 A | 10/2004 | |
| JP | 200649964 A | 2/2006 | |
| JP | 2009003639 A | 1/2009 | |
| JP | 2009111559 A | 5/2009 | |
| JP | 2009289205 A | 12/2009 | |
| JP | 2010124381 A | 6/2010 | |
| JP | 2010161675 A | 7/2010 | |
| JP | 2011160226 A | 8/2011 | |
| JP | 201316190 A | 1/2013 | |
| JP | 2014238507 A | 12/2014 | |
| KR | 20120087277 A | 8/2012 | |
| KR | 20130044616 A | 5/2013 | |
| RU | 2524865 C2 | 8/2014 | |
| WO | 2009057485 A1 | 5/2009 | |

OTHER PUBLICATIONS

Office action from KIPO dated Jul. 20, 2016 for Korean Application No. 10-2015-7009204.

Office action from KIPO dated Jan. 25, 2016 for Korean Application No. 10-2015-7009204.

Office action from JPO dated Dec. 6, 2016 for Japanese Application No. 2016-543311.

Office action from EPO dated Jan. 5, 2016 for European Application No. 15181666.7.

Office action from RPO dated Jan. 9, 2017.

\* cited by examiner

METHOD AND DEVICE FOR TRANSMITTING IMAGE

CROSS-REFERENCE TO RELATED APPLICATIONS

This application is a Continuation application of International Application No. PCT/CN2015/071363, filed with the State Intellectual Property Office of P. R. China on Jan. 22, 2015, which is based upon and claims priority and benefits of Chinese Patent Application No. 201410419285.2, filed with State Intellectual Property Office on Aug. 22, 2014, the entire content of which is incorporated herein by reference.

TECHNICAL FIELD

The present disclosure generally relates to communication and computer processing fields, and more particularly, to a method and a device for transmitting an image.

BACKGROUND

With the development of the electronic technology, it is common to take photos and view images online. The user may view images online and later download the images of interest to local disk. The user may also share excellent photos taken by himself with his friends. Moreover, most electronic products have a web-browsing function or may be communicatively coupled with other electronic products. For example, the user may project the image in a mobile phone onto a television to view the image thereon.

The inventors of the present disclosure have found that, in the related art, the screen of the mobile phone is much smaller than that of the television, i.e., the resolution of the mobile phone is significantly lower than that of the television. When the user projects the image in the mobile phone onto the television, the image displayed on the television is not clear due to the low resolution of the image. Therefore, there is a need to obtain the image of high quality.

SUMMARY

The present disclosure provides a method and a device for transmitting an image.

A first aspect of the present disclosure provides a method for transmitting an image. The method includes receiving an image with a first resolution from a source terminal; sending a request for obtaining the image to a server according to an identifier of the image; and receiving the image with a second resolution from the server, wherein the second resolution is higher than the first resolution.

The technical solution provided by embodiments of the present disclosure has following advantages. Devices in embodiments of the present disclosure obtain the image of a low resolution from the source terminal, and then request obtaining the image of a high resolution from the server. The image of the high resolution or quality is suitable to be displayed on a local device, thus improving the display effect.

A second aspect of embodiments of the present disclosure provides a device for transmitting an image, including: a processor; a memory configured to store an instruction executable by the processor; in which the processor is configured to receive an image with a first resolution from a source terminal; send a request for obtaining the image to a server according to an identifier of the image; and receive the image with a second resolution from the server, wherein the second resolution is higher than the first resolution.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1A:
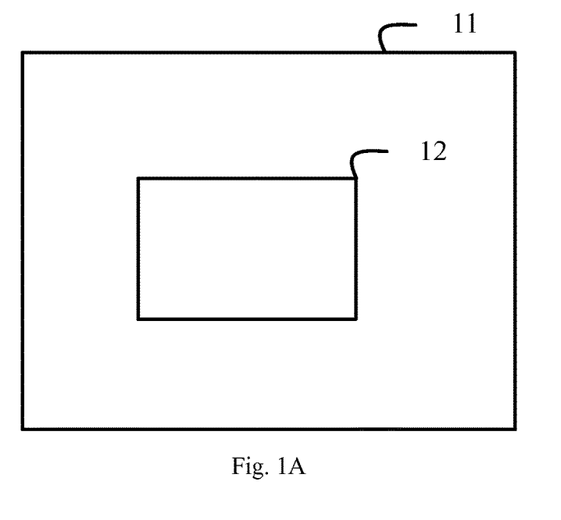
FIG. 1A is a schematic diagram of a display interface according to an exemplary embodiment.

In the related art, a display screen of a television is larger than that of a mobile phone. In order to realize a better display effect and to view images with friends, a user may transmit an image in the mobile phone to the television to display the image thereon. However, a resolution of the image in the mobile phone is lower than that of the image in the television, and the display effect of the image in the television is illustrated in FIG. 1A. As shown in FIG. 1A, a display interface of the television is denoted by reference number 11 and the image is denoted by reference number 12. It is clearly shown that a large blank area exists in the display interface of the television without obtaining a desired display effect. If the image is enlarged to occupy the entire display interface, the image will be indistinct, thereby resulting in a poor display effect. In order to solve the problem, in certain embodiments of the present disclosure, after receiving the image of a low resolution from the mobile phone, the television may obtain the same image of a high resolution from a server to satisfy the display requirement of the television, thus improving the display effect.

Figure 1B:
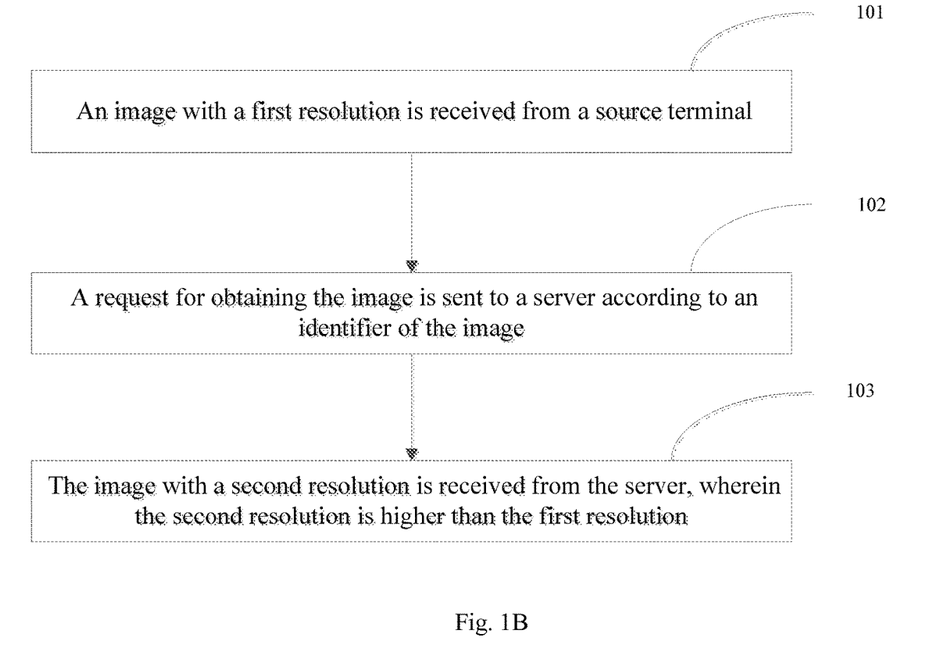
FIG. 1B is a flow chart of a method for transmitting an image according to an exemplary embodiment.

FIG. 1B is a flow chart of a method for transmitting an image according to an exemplary embodiment. As shown in FIG. 1B, the method may be implemented in a display device with a large screen, such as a television. The method includes following steps.

At step S101, an image with a first resolution is received from a source terminal. For example, the source terminal can be a device with a relatively small screen, such as a mobile terminal.

At step S102, a request for obtaining the image is sent to a server according to an identifier of the image.

At step S103, the image with a second resolution is received from the server, wherein the second resolution is higher than the first resolution.

The embodiment is suitable for a device having a display screen with a resolution higher than that of the mobile phone. When receiving the image from the source terminal, the device sends the request to the server to obtain the same image of a higher resolution. Thus, the display effect is improved and the performance of the device can be fully used.

For example, a resolution of the mobile terminal may be 1024×768, and the resolution of the image stored in the mobile terminal also is 1024×768, which can be named as 1K (which indicates the resolution thereof) image. A resolution of the television may be 4096×2160. The mobile terminal sends the 1K image to the television. After receiving the 1K image, the television sends the request to the server to obtain a 4K image (a resolution corresponding to 4096×2160). After receiving the 4K image, the television displays the image locally. Thus, the image of higher resolution is obtained and the display effect can be improved.

In an embodiment, the identifier of the image such as "100ZP1001" may be an identifier automatically generated when the mobile terminal or a camera takes a photo. The mobile terminals of the same model may have the same identifier. Since different images may have the same identifier, the image from the server may be different from that received from the mobile terminal. Moreover, the images of other users may be obtained without the permission of the other users, thus adversely affecting the security of the other users' images. In order to solve the problem, in the embodiment, the method further includes step A. At step A, the user may log into the server with a predetermined account. Then at step S103, the image with the second resolution in an image database corresponding to the predetermined account is received from the server.

The user may log into the server through the mobile terminal with the predetermined account, upload the image with the second resolution and store the image with the second resolution in the server. A same application may be logged in with the same predetermined account in the mobile terminal and in the television respectively, and the mobile terminal and the television communicate with each other through the application. The mobile terminal sends the image with the first resolution to the television through the application. Since the application is logged in with the predetermined account in the television, i.e., the television is communicatively coupled with the server via the predetermined account. When the television sends the request for obtaining the image to the server, information of the predetermined account is also carried and sent to the server. After receiving the request, the server searches for the image requested by the television in the image database corresponding to the predetermined account. For example, the server searches for a 4K image identified by "100ZP1001". Then, the server sends the obtained image to the television.

In an embodiment, in order to improve the security, the method further includes step B. At step B, information for security authentication is sent to the server. Therefore, at step S103, after a successful authentication, the image with the second resolution is received from the server.

The information for security authentication may be sent separately from the television, or be carried in the request. The server authenticates the information for security authentication. If the authentication is successful, the server searches for the image requested by the television and sends the image back to the television. If the authentication is not successful, the server sends a refusing response to the television. The information for security authentication may be a password or a verification code.

In an embodiment, the server may store various resolutions of an image, which have the same content. If the television can request to obtain the image of a resolution corresponding to the resolution of the television, the image of high quality can be displayed to improve the display effect, and the resource for processing may be appropriately occupied. In order to solve the problem, the request includes a resolution of a device, and a difference between the second resolution and the resolution of the device is minimum of differences of all resolutions of the image from the resolution of the device.

In another embodiment, the request includes a type of the device and/or a model number of the device, instead of carrying the resolution of the device directly. The server determines the resolution of the device according to the type of the device and/or the model number of the device. Then, the server searches for the image matching with the resolution of the device, i.e., the difference between the second resolution and the resolution of the device is minimum of differences of all resolutions of the image from the resolution of the device. For example, the type of the device may be an XX's television, an XX's tablet PC and an XX's displayer. If a certain brand manufacturer only produces one type of television, the resolution of the television may be determined. The model number of the device may include the brand and the type of the device, such as an XX's 47-inch ultrathin smart television.

For example, the resolution of the mobile terminal is 1024×768, and the resolution of the image "100ZP1001" stored in the mobile terminal is also 1024×768, which can be named as a 1K (which indicates the resolution thereof) image. Moreover, the resolution of the television is 3008×1620. The mobile terminal sends the 1K image to the television. After receiving the 1K image, the television sends the request for obtaining the image "100ZP1001" to the server. The request carries the resolution of the television i.e. 3008×1620, and the identifier of the image "100ZP1001". The server stores various resolutions of the image "100ZP1001", e.g. 1024×768, 1920×1080, 3008×1620 and 4096×2160. The server compares the resolution 3008×1620 of the device with each resolution of the images "100ZP1001" and determines that the difference between the resolution 3008×1620 of the image "100ZP1001" and the resolution of the device is minimum, which is zero. Then, the server sends the image "100ZP1001" of the resolution 3008×1620 to the television. The difference is an absolute value of a difference between two resolutions.

In an embodiment, if the server does not store the image "100ZP1001" of the resolution 3008×1620, the difference of the resolution 1920×1080 from the resolution of the device 3008×1620 and the between of the resolution 4096×2160 from the resolution of the device 3008×1620 are two minimum ones of the differences of all resolutions of the image from the resolution of the device. Then, it needs to be decided which of the resolutions of the image should be sent to the television by the server? In order to solve this problem, in the embodiment, where there are two minimum ones of the differences of all resolutions of the image from the resolution of the device, the second resolution is higher than the resolution of the device. In other words, the resolution higher than 3008×1620 is selected to be sent out. For the resolutions 1920×1080 and 4096×2160, the resolution 4096×2160 is selected.

In the embodiment, the quality of the image is of higher priority to the network resource occupation, and thus the image of high quality may be obtained. After receiving the image of the resolution 4096×2160, the television zooms out the image of the resolution 4096×2160 to fit for the resolution of the device 3008×1620 for display.

In an embodiment, in order to display the image quickly and realize good user experience, the method further includes step C1 and step C2.

At step C1, the image with the first resolution is displayed.

At step C2, the image with the first resolution is replaced by the image with the second resolution after the image with the second resolution is received.

When receiving the image with the first resolution, the television displays the image with the first resolution immediately, thus reducing a time delay from transmitting the image to viewing the image. After receiving the image with the second resolution, the television displays the image with the second resolution and hides or deletes the image with the first resolution. Therefore, the user may view the image as quick as possible and may view the image of high quality after receiving the image with the second resolution.

In an embodiment, at step C2, the image with the first resolution is replaced by the image with the second resolution in a refreshing manner.

For example, when the image with the first resolution is received from the mobile terminal, the television stores the image with the first resolution in a first buffer. When displaying the image with the first resolution, the television obtains the image with the first resolution from the first buffer and refreshes the screen with the image with the first resolution. When the image with the second resolution is received, the television stores the image with the second resolution in a second buffer. The television obtains the image with the second resolution from the second buffer and refreshes the screen with the image with the second resolution. Thus, the image with the first resolution is replaced by the image with the second resolution. Moreover, the speed of refreshing the screen is quick, which may not be visibly identified, thus realizing a smooth transition from the image with the first resolution to the image with the second resolution and reducing adverse influence on image viewing of the user.

The process of transmitting the image will be described in detail with reference to several embodiments.

Figure 2:
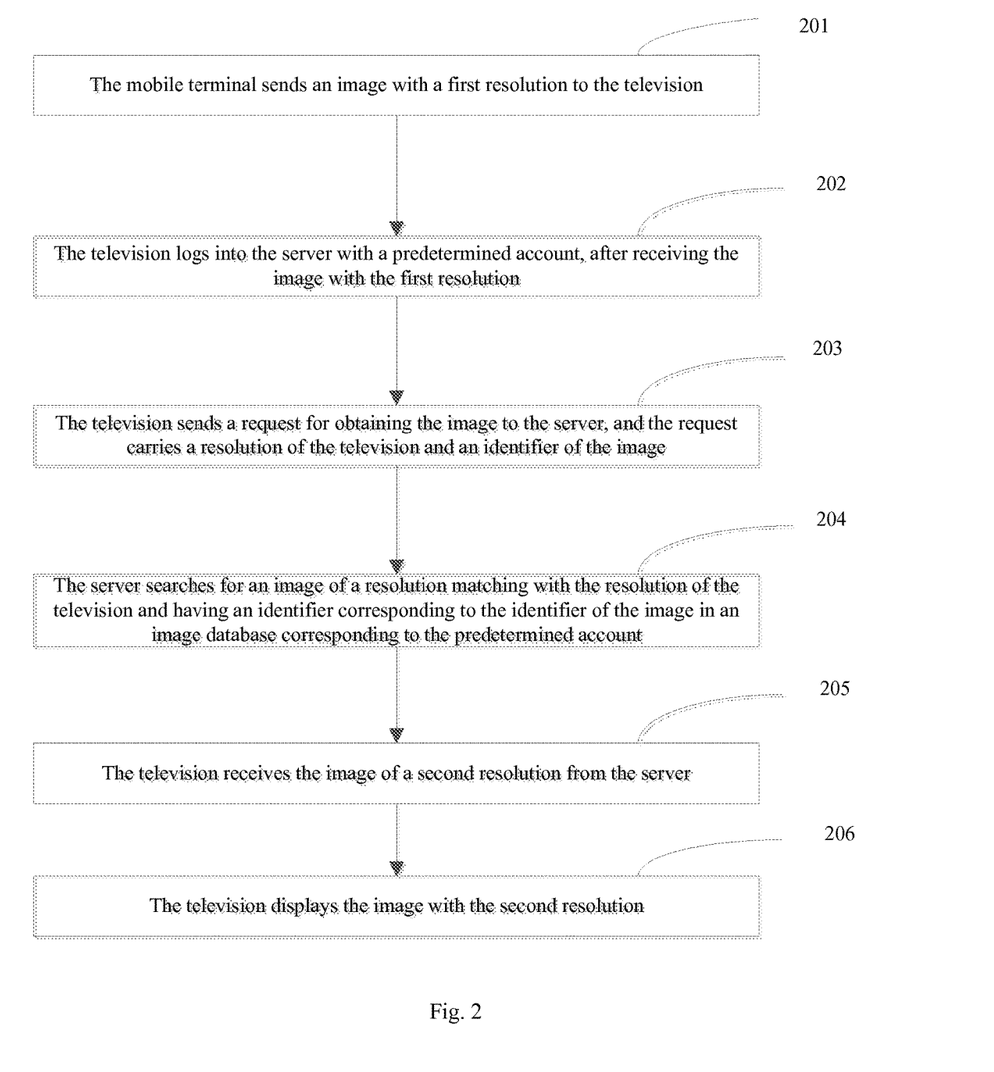
FIG. 2 is a flow chart of a method for transmitting an image according to an exemplary embodiment.

FIG. 2 is a flow chart of a method for transmitting an image according to an exemplary embodiment. As shown in FIG. 2, the method may be implemented by a source terminal (such as a mobile terminal), a display device (such as a television) with a large screen and a server and include following steps.

At step 201, the mobile terminal sends an image with a first resolution to the television.

At step 202, the television logs into the server with a predetermined account after receiving the image with the first resolution.

At step 203, the television sends a request for obtaining the image to the server. The request carries a resolution of the television and an identifier of the image.

At step 204, the server searches for an image of a resolution matching with the resolution of the television and having an identifier corresponding to the identifier of the image in an image database corresponding to the predetermined account.

At step 205, the television receives the image with a second resolution from the server.

At step 206, the television displays the image with the second resolution.

In the embodiment, the television logs into the server with the predetermined account. The server searches for the image requested by the television in the image database corresponding to the predetermined account, and the image obtained has the resolution matching with that of the television. Thus, the television may obtain the image of high quality, the display effect may be improved and the communication resource may be used effectively.

Figure 3:
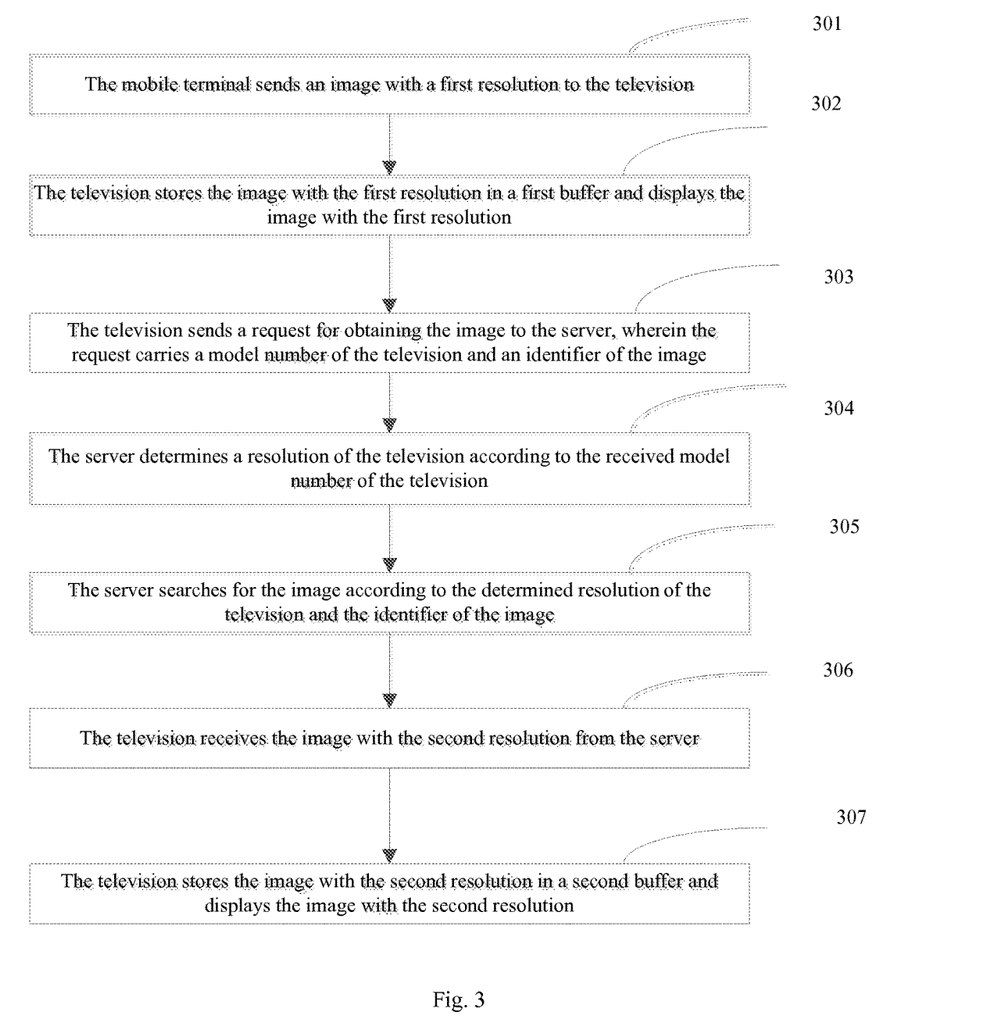
FIG. 3 is a flow chart of a method for transmitting an image according to an exemplary embodiment.

FIG. 3 is a flow chart of a method for transmitting an image according to an exemplary embodiment. As shown in FIG. 3, the method may be implemented by a mobile terminal, a display device (such as a television) with a large screen and a server and include following steps.

At step 301, the mobile terminal sends an image with a first resolution to the television.

At step 302, the television stores the image with the first resolution in a first buffer and displays the image with the first resolution.

At step 303, the television sends a request for obtaining the image to the server. The request carries a model number of the television and an identifier of the image.

At step 304, the server determines a resolution of the television according to the received model number of the television.

At step 305, the server searches for the image according to the determined resolution of the television and the identifier of the image.

At step 306, the television receives the image with the second resolution from the server.

At step 307, the television stores the image with the second resolution in a second buffer and displays the image with the second resolution.

In the embodiment, the television refreshes the screen with the image in the second buffer, and thus the image with the second resolution may be displayed. Moreover, when the image with the first resolution is replaced by the image with the second resolution, it is difficult for the user to perceive, i.e., it is possible to realize a smooth transition from the image with the first resolution to the image with the second resolution, thus resulting in better display effect and better user experience.

Figure 4:
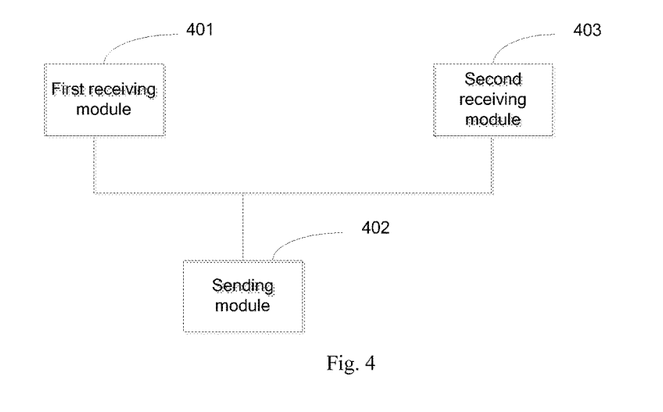
FIG. 4 is a block diagram of an apparatus for transmitting an image according to an exemplary embodiment.

FIG. 4 is a block diagram of an apparatus for transmitting an image according to an exemplary embodiment. With reference to FIG. 4, the apparatus includes a first receiving module 401, a sending module 402 and a second receiving module 403. The apparatus may be included in a device with a display screen larger than that of a mobile phone, such as a television, a desk computer, a notebook computer and a tablet personal computer.

The first receiving module 401 is configured to receive an image with a first resolution from a source terminal.

The sending module 402 is configured to send a request for obtaining the image to a server according to an identifier of the image.

The second receiving module 403 is configured to receive the image with a second resolution from the server, wherein the second resolution is higher than the first resolution.

Figure 5:
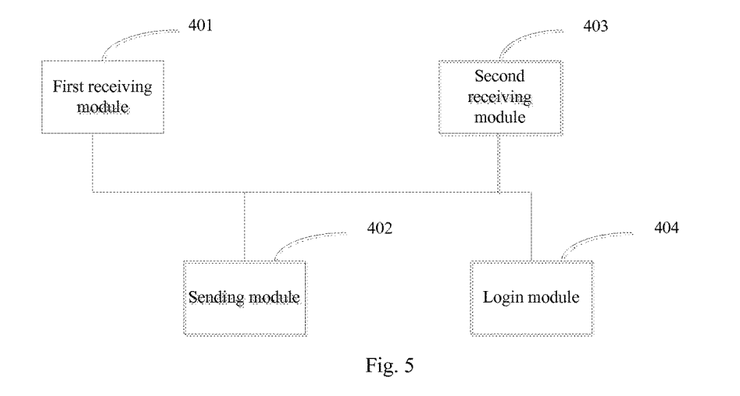
FIG. 5 is a block diagram of a device for transmitting an image according to an exemplary embodiment.

In an embodiment, as shown in FIG. 5, the apparatus further includes a login module 404.

The log-in module 404 is configured to log into the server with a predetermined account.

The second receiving module 403 is configured to receive the image with the second resolution in an image database corresponding to the predetermined account from the server.

In an embodiment, the request includes a resolution of the device, and a difference between the second resolution and the resolution of the device is minimum of differences of all resolutions of the image from the resolution of the device. Alternatively, the request includes a type of the device and/or a model number of the device, and the server determines the resolution of the device according to the type of the device and/or the model number of the device. The difference between the second resolution and the resolution of the device is minimum of differences of all resolutions of the image from the resolution of the device.

Figure 6:
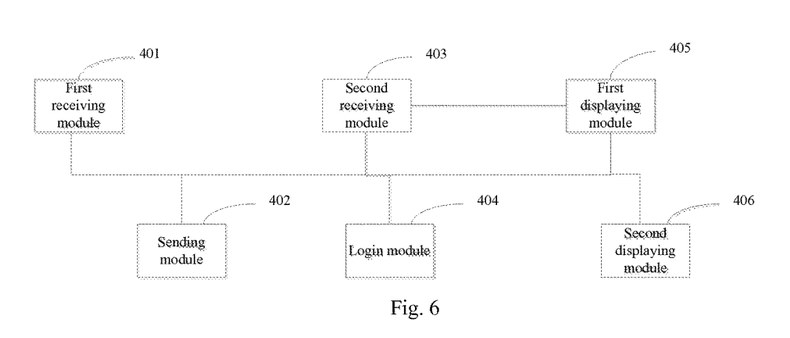
FIG. 6 is a block diagram of a device for transmitting an image according to an exemplary embodiment.

In an embodiment, as shown in FIG. 6, the apparatus further includes a first displaying module 405 and a second displaying module 406.

The first displaying module 405 is configured to display the image with the first resolution.

The second displaying module 406 is configured to replace the image with the first resolution by the image with the second resolution after receiving the image with the second resolution.

In an embodiment, the second displaying module 406 is configured to replace the image with the first resolution by the image with the second resolution in a refreshing manner.

With respect to the apparatuses in the above embodiments, the specific manners for performing operations for individual modules therein have been described in detail in the embodiments regarding the methods for transmitting images, which will not be elaborated herein.

Figure 7:
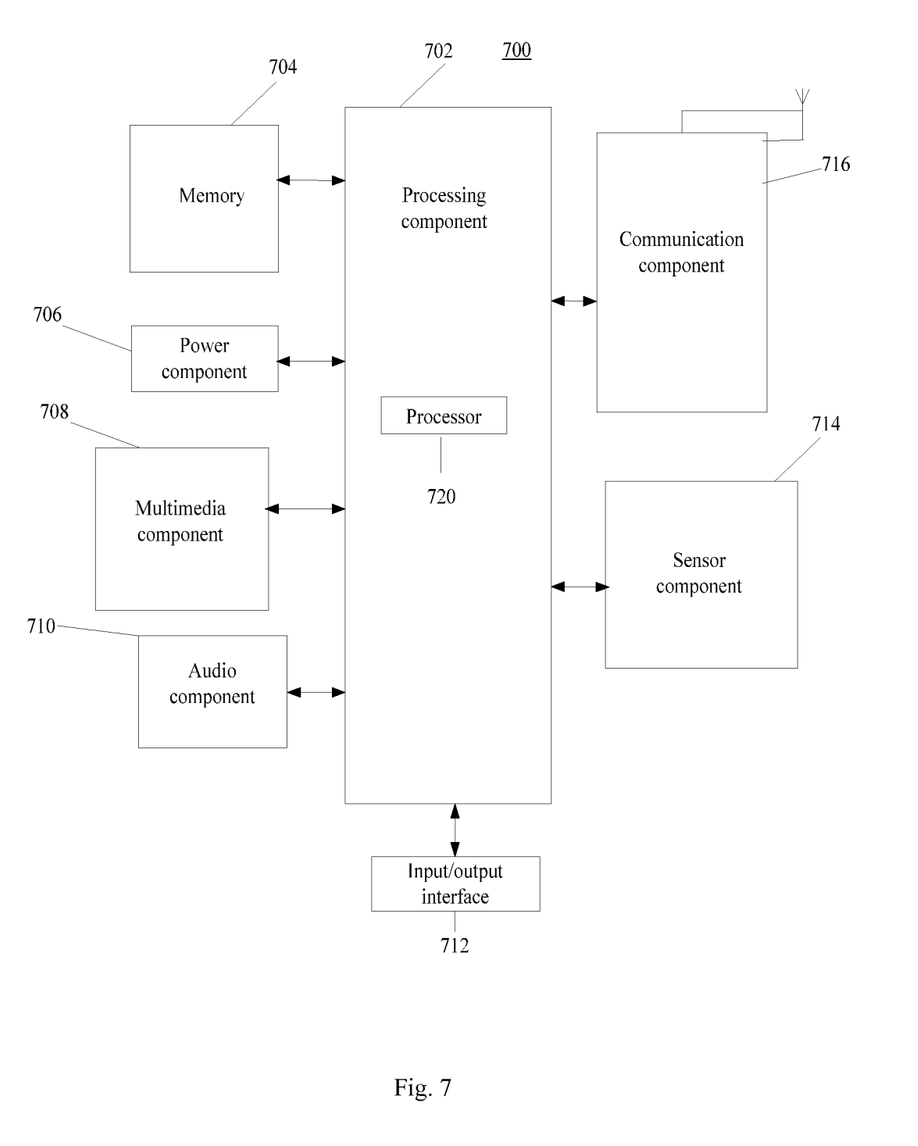
FIG. 7 is a block diagram of a device according to an exemplary embodiment.

FIG. 7 is a block diagram of a device 700 for transmitting an image, according to an exemplary embodiment. For example, the device 700 may be a mobile phone, a television, a computer, a digital broadcast terminal, a messaging device, a gaming console, a tablet, a medical device, exercise equipment, a personal digital assistant, and the like.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700 such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 may access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identifier (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

In certain embodiments, there is provided a device for transmitting an image is provided, including: a processor; a memory configured to store an instruction executable by the processor; wherein the processor is configured to receive an image with a first resolution from a source terminal; send a request for obtaining the image to a server according to an identifier of the image; and receive the image with a second resolution from the server, wherein the second resolution is higher than the first resolution.

The processor is further configured to log into the server with a predetermined account before sending the request for obtaining the image to a server according to an identifier of the image. The step of receiving the image with a second resolution from the server includes: receiving the image with the second resolution in an image database corresponding to the predetermined account from the server.

The processor is further configured in the following manner. The request includes a resolution of a device, and a difference between the second resolution and the resolution of the device is minimum of differences of all resolutions of the image from the resolution of the device. Alternatively, the request includes a type of the device and/or a model number of the device, the server determines the resolution of the device according to the type of the device and/or the model number of the device, and the difference between the second resolution and the resolution of the device is minimum of differences of all resolutions of the image from the resolution of the device.

The processor is further configured in the following manner. When there are two minimum ones of differences of all resolutions of the image from the resolution of the device, the second resolution is higher than the resolution of the device.

The processor is further configured in the following manner. All the resolutions of the image in the server are uploaded by the source terminal.

The processor is further configured to display the image with the first resolution; replace the image with the first resolution by the image with the second resolution after receiving the image with the second resolution.

The processor is further configured to replace the image with the first resolution by the image with the second resolution in a refreshing manner.

A non-transitory computer-readable storage medium is provided, in which when the instructions in the storage medium are executed by a processor of a device, the device may execute a method for transmitting an image, including: receiving an image with a first resolution from the source terminal; sending a request for obtaining the image to a server according to an identifier of the image; and receiving the image with a second resolution from the server, wherein the second resolution is higher than the first resolution.

The method further includes: logging into the server with a predetermined account before sending the request for obtaining the image to the server according to an identifier of the image. The step of receiving the image of the second resolution from the server includes: receiving the image with the second resolution in an image database corresponding to the predetermined account from the server.

In certain embodiments, the request includes a resolution of a device, and a difference between the second resolution and the resolution of the device is minimum of differences of all resolutions of the image from the resolution of the device. Alternatively, the request includes a type of the device and/or a model number of the device, and the server determines the resolution of the device according to the type of the device and/or the model number of the device. The difference between the second resolution and the resolution of the device is the minimum of differences of all resolutions of the image from the resolution of the device.

When there are two minimum ones of the differences of all resolutions of the image from the resolution of the device, the second resolution is higher than the resolution of the device.

In certain embodiments, all the resolutions of the image in the server are uploaded by the source terminal.

The method further includes displaying the image with the first resolution; replacing the image with the first resolution by the image with the second resolution after receiving the image with the second resolution.

The step of replacing the image with the first resolution by the image with the second resolution includes replacing the image with the first resolution by the image with the second resolution in a refreshing manner.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting an image, applied to a device, the method comprising:

receiving an image with a first resolution directly from a source terminal;

displaying the image with the first resolution;

sending a request for obtaining the image to a server according to an identifier of the image; and receiving the image with a second resolution directly from the server, wherein the second resolution is higher than the first resolution;

wherein the request comprises:
- a resolution of the device, and a difference between the second resolution and the resolution of the device is minimum of differences of all resolutions of the image from the resolution of the device; or
- a type of the device and/or a model number of the device, the server determines the resolution of the device according to the type of the device and/or the model number of the device, and the difference between the second resolution and the resolution of the device is minimum of differences of all resolutions of the image from the resolution of the device;

wherein when there are two resolutions of all resolutions of the image that have equal minimum difference from the resolution of the device, the second resolution is higher than the resolution of the device;

replacing the image with the first resolution by the image with the second resolution after receiving the image with the second resolution.

2. The method of claim 1, further comprising:

logging into the server with a predetermined account before sending the request for obtaining the image to the server according to the identifier of the image.

3. The method of claim 2, wherein receiving the image of the second resolution from the server comprises: receiving from the server the image with the second resolution in an image database corresponding to the predetermined account.

4. The method of claim 1, wherein all the resolutions of the image in the server are uploaded by the source terminal.

5. The method of claim 1, wherein replacing the image with the first resolution by the image with the second resolution comprises: replacing the image with the first resolution by the image with the second resolution by refreshing a screen with the image with the second resolution.

6. A device for transmitting an image, comprising:

a processor;

a memory configured to store an instruction executable by the processor;

wherein the processor is configured to:

receive an image with a first resolution directly from a source terminal;

display the image with the first resolution;

send a request for obtaining the image to a server according to an identifier of the image; and receive the image with a second resolution directly from the server, wherein the second resolution is higher than the first resolution;

wherein the request comprises:
- a resolution of the device, and a difference between the second resolution and the resolution of the device is minimum of differences of all resolutions of the image from the resolution of the device; or
- a type of the device and/or a model number of the device, the server determines the resolution of the device according to the type of the device and/or the model number of the device, and the difference between the second resolution and the resolution of the device is minimum of differences of all resolutions of the image from the resolution of the device;

wherein when there are two resolutions of all resolutions of the image that have equal minimum difference from the resolution of the device, the second resolution is higher than the resolution of the device;

replace the image with the first resolution by the image with the second resolution after receiving the image with the second resolution.

7. The device of claim 6, wherein the processor is further configured to log into the server with a predetermined account and to receive from the server the image with the second resolution in an image database corresponding to the predetermined account.

8. The method of claim 6, wherein all the resolutions of the image in the server are uploaded by the source terminal.

9. The device of claim 6, wherein the processor is configured to replace the image with the first resolution by the image with the second resolution by refreshing a screen with the image with the second resolution.

10. A non-transitory computer-readable storage medium having stored therein instructions that, when executed by a processor of a device, causes the device to perform a method for transmitting an image, the method comprising:

receiving an image with a first resolution directly from a source terminal;

displaying the image with the first resolution;

sending a request for obtaining the image to a server according to an identifier of the image; and receiving the image with a second resolution directly from the server, wherein the second resolution is higher than the first resolution;

wherein the request comprises:
- a resolution of the device, and a difference between the second resolution and the resolution of the device is minimum of differences of all resolutions of the image from the resolution of the device; or
- a type of the device and/or a model number of the device, the server determines the resolution of the device according to the type of the device and/or the model number of the device, and the difference between the second resolution and the resolution of the device is minimum of differences of all resolutions of the image from the resolution of the device;

wherein when there are two resolutions of all resolutions of the image that have equal minimum difference from the resolution of the device, the second resolution is higher than the resolution of the device;

replacing the image with the first resolution by the image with the second resolution after receiving the image with the second resolution.

* * * * *